United States Patent [19]
Tanimoto

[11] 3,862,363
[45] Jan. 21, 1975

[54] PULSE PHASE DOUBLE MODULATION SYSTEM FOR RESPECTIVELY MODULATING THE LEADING AND TRAILING EDGES OF A CARRIER PULSE WITH TWO DIFFERENT INFORMATION SIGNALS

[75] Inventor: Kenji Tanimoto, Tokyo, Japan

[73] Assignee: Fuji Xerox Co., Ltd., Tokyo, Japan

[22] Filed: Feb. 15, 1973

[21] Appl. No.: 332,607

[30] Foreign Application Priority Data

Feb. 17, 1972 Japan ............................... 47-15987

[52] U.S. Cl. .......................... 179/15 AW, 179/15 R
[51] Int. Cl. ............................................ H04j 7/00
[58] Field of Search ........ 179/15 AW, 15 BT, 15 R, 179/15 BW; 332/21; 307/265; 178/50

[56] References Cited

UNITED STATES PATENTS

| | | | |
|---|---|---|---|
| 2,017,886 | 10/1935 | Barden | 179/15 BT X |
| 2,498,678 | 2/1950 | Grieg | 179/15 AW |
| 3,080,526 | 3/1963 | Porter | 179/15 AW X |

*Primary Examiner*—David L. Stewart
*Attorney, Agent, or Firm*—J. T. Martin; Gerald J. Ferguson, Jr.; Joseph J. Baker

[57] ABSTRACT

A system for communicating two information signals, comprising means for generating a carrier pulse wave; means for modulating the leading edge of each pulse of the carrier pulse wave with one of the two information signals, the means for phase modulating the leading edge of the carrier pulse wave comprising (a) means for deriving first pulses corresponding to the leading edges of the carrier pulse wave, (b) a first monostable multivibrator responsive to the first pulses and the one information signal, so that the phase of the trailing edges of the first monostable multivibrator output pulses are modulated by the one information signal, and (c) means for extracting first modulated pulses from the last-mentioned output pulses corresponding to the trailing edges thereof; means for phase modulating the trailing edge of each pulse of the carrier pulse wave with the other of the two information signals to thereby obtain a double phase modulated signal; means for transmitting the double phase modulated signal over a communications link; means at the receiving end of the link for generating a first reference signal responsive to the carrier pulse wave indicating the phase of the leading edge of the carrier pulse wave; means at the receiving end of the link for generating a second reference signal responsive to the carrier pulse wave indicating the phase of the trailing edge of the carrier pulse wave; means responsive to the double phase modulated signal and the first reference signal for demodulating the double phase modulated signal to obtain the one information signal; and means responsive to the double phase modulated signal and the second reference signal for demodulating the double phase modulated signal to obtain the other information signal.

2 Claims, 4 Drawing Figures

PULSE PHASE DOUBLE MODULATION SYSTEM FOR RESPECTIVELY MODULATING THE LEADING AND TRAILING EDGES OF A CARRIER PULSE WITH TWO DIFFERENT INFORMATION SIGNALS

BACKGROUND OF THE INVENTION

This invention relates to pulse phase double modulation systems, in which a carrier pulse wave is pulse phase modulated for transmitting said carrier pulse wave thus modulated on the leading and trailing edges thereof using two-channel or multi-channel signal information for multiplex transmission of the information via transmission line, and on whose receiver side the leading and trailing edges of the received modulated carrier wave are separated to thereby obtain the original two-channel or multi-channel signals.

SUMMARY OF THE INVENTION

The object of the invention is to provide the communication systems utilizing a transmission line such as telephone line and which permits simultaneous transmission of a plurality of informations without expanding the bandwidth to thereby substantially enable the compression of the bandwidth.

BRIEF DESCRIPTION OF THE DRAWING

In the drawing, which illustrates one embodiment of the invention.

DESCRIPTION OF PREFERRED EMBODIMENT

Figure 1:
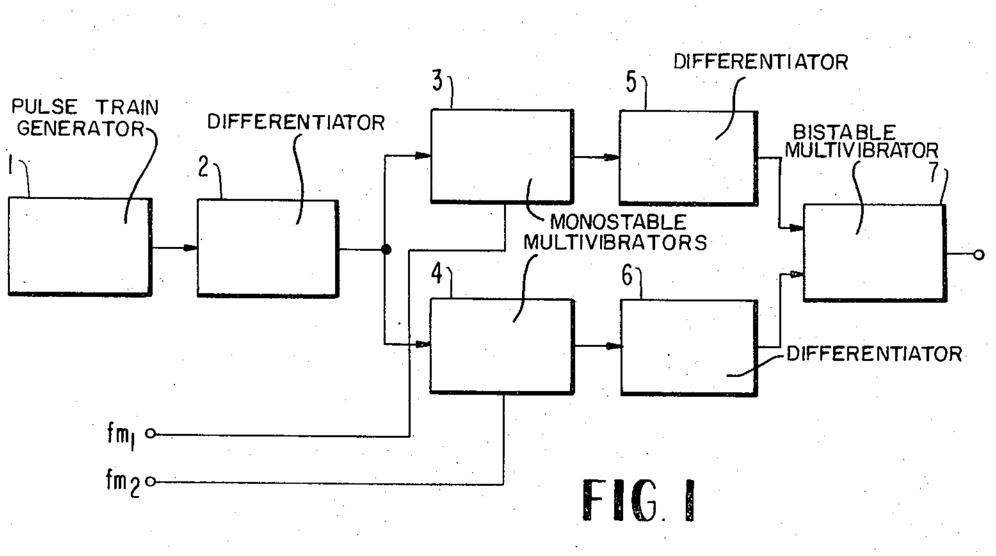
FIG. 1 is a block diagram of a transmitter.

The principles underlying the invention will now be discussed in detail. It is now assumed that two-channel signals to be transmitted are modulated inputs $W_{m1}$ ($W_{m1} = 2\pi f_{m1}$) and $W_{m2}$ ($W_{m2} = 2\pi f_{m2}$). In pulse phase modulating the leading and trailing edges of a carrier pulse wave, with carrier wave period being To, maximum phase deviation being $\Delta\phi$ and modulation index being $m$.

The leading and trailing edges of the carrier pulse wave are expressed respectively as $S'(t)$ and $S''(t)$, and the $n$-th order harmonic of the pulse phase double modulation wave (PPD) is expressed as $$Sn(t) = Cn \cdot e^{jn\omega_o t} \qquad 1.$$

$Cn$ in equation 1 is a coefficient of Fourier series given as $$Cn = \frac{1}{To}\int_{t/2}^{t/2} (-1) e^{-jn\omega_0 t} dt = \frac{1}{-j2\pi f_o n}\left[e^{-jn\omega_0 (t/2)} e^{jn\omega_0 (t/2)}\right] \qquad (2)$$

Thus, equation 1 may be re-written as $$Sn(t) = 1/-j\,2\pi f_o n\,[e^{-jn\omega_o(T/2)} - e^{jn\omega_o(T/2)}] \cdot e^{jn\omega_o t} = 0.1/-j2\pi f_o n \cdot e^{jn\omega_o(t-T/2)} + 1/j2\pi f_o n \cdot e^{jn\omega_o(t+T/2)} = S'n(t) + S''n(t) \qquad 3.$$

Expressing the modulating input signals as $$S_1(t) = \sin Wm_1 t$$

and $$S_2(t) = \sin Wm_2 t$$

for phase modulation with respect to $S'(t)$, $$\tau'/2 = \tau_o/2\ \{1 + m_1 \sin Wm_1(t - \tau_o/2)\} \qquad 4.$$

and for phase modulation with respect to $S''(t)$ $$\tau''/2 = \tau_o/2\ \{1 + m_2 \sin Wm_2(t - \tau_o/2)\} \qquad 5.$$

Thus, from equation 3, $$S'n(t) = 1/-j2\pi f_o n\ e^{jn\omega_o\{t-[\tau_o/2(1+m_1 \sin Wm_1(t-\tau_o/2))]\}} = -1/j2\pi f_o n\ e^{jn[\omega_o(t-\tau_o/2) - \omega_o\tau_o m_1/2 \sin Wm_1(t-\tau_o/2)]}$$

By substituting $$t' = t - (\tau_o/2)$$

and $$\Delta\phi_1 = \omega_o\tau_o m_1/2 = m_1\pi(\tau_o/T_o)$$

we have $$S'n(t) = -(1/j2\pi f_o n) \cdot e^{jn(\omega_o t' - \Delta\phi_1 \sin Wm_1 t')} \qquad 6.$$

Similarly, we have $$S''n(t) = 1/j2\pi f_o n \cdot e^{jn(\omega_o t'' + \Delta\phi_2 \sin Wm_2 t'')} \qquad 7.$$

where $$t'' = t + \tau_o/2$$

and $$\Delta\phi_2 = \omega_o\tau_o m_2/2$$

Equations 6 and 7 can be re-written as $$S'n(t) = -\frac{1}{j2\pi f_o n}\sum_{q=-\infty}^{\infty} J_q(n\varphi_1)(-1)^q e^{j(n\omega_0 + q\omega m_1)t'} \qquad (8)$$

and $$S''n(t) = \frac{1}{j2\pi f_o n}\sum_{q=-\infty}^{\infty} J_q(n\varphi_2) e^{-j(n\omega_0 + q\omega m_2)t''} \qquad (9)$$

Thus, the spectral amplitude for the $q$-th order sideband of the $n$-th order harmonic can be expressed as $$C'n(q) = (-1)^{q+1} \cdot 1/j2\pi f_o n \cdot Jq(n\phi_1) \cdot e^{-j(n\omega_o + q\omega m_1)\tau_o/2} \cdot e^{-j(n\omega_o + q\omega m_1)t} \qquad 10.$$

and $$C''n(q) = 1/j2\pi f_o n \cdot Jq(n\phi_2) \cdot e^{j(n\omega_o + q\omega m_1)\tau_o/2} \cdot e^{j(n\omega_o + q\omega m_1)t} \qquad 11.$$

Considering the case of $n = 1$ in equation 10, for $$\phi << 1$$

$$J_o(\phi_1) >> \sqrt{[J_1(\phi_1)]^2 + [J_2(\phi_2)]^2 + \ldots}$$

It will thus be seen that the first term alone can be considered as the sideband. Entirely the same thing as in equation 10 holds in equation 11 for $\phi_2 << 1$. Thus, with the pulse phase double modulation with two input signals $W_{m1}$ and $W_{m2}$ following equations 10 and 11, it is possible to transmit twice the information through the usual bandwidth.

A detailed embodiment of the invention will now be described with reference to the accompanying drawing.

Figure 2:
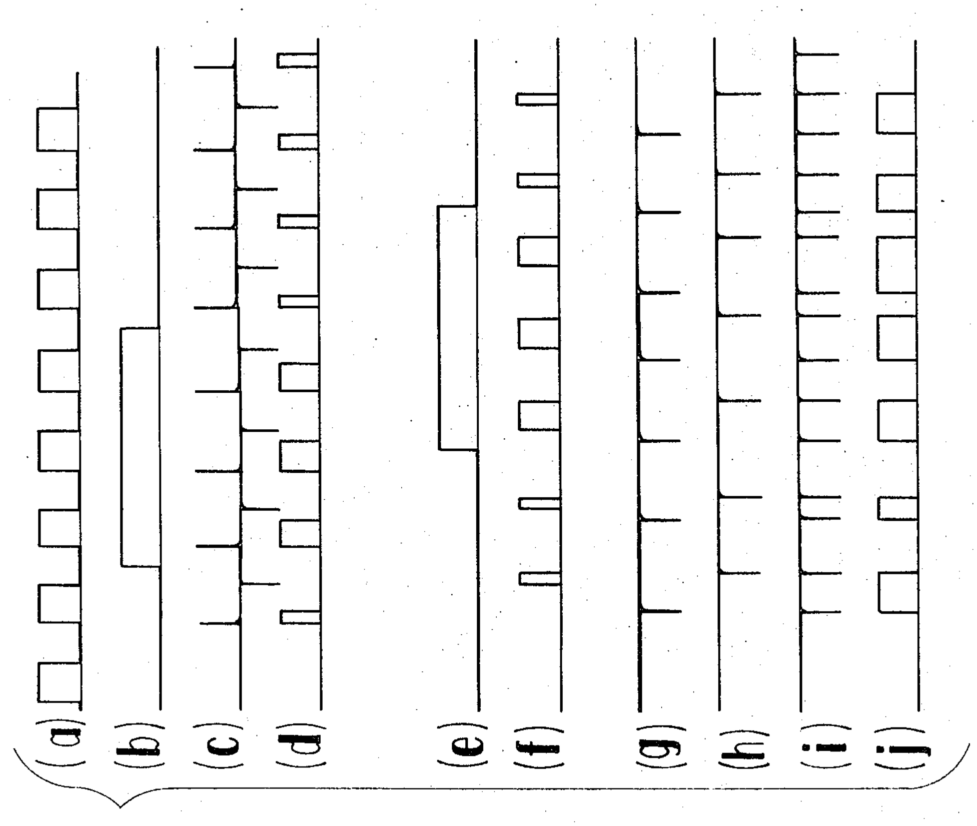
FIG. 2 is a waveform chart to illustrate the operation of the same.

FIG. 1 shows a transmitter to transmit two-channel signal. Reference numeral 1 designates a carrier pulse wave generator generating a carrier pulse wave as shown at (a) in FIG. 2, which is differentiated by a next-stage differentiating circuit 2 into a trigger pulse train of positive and negative trigger pulses alternately appearing one after another as shown at (c) in FIG. 2. Of the trigger pulses thus obtained only positive ones are used to trigger one of two monostable multivibrators 3 and 4, namely multi-vibrator 3, connected to the output side of the differentiating circuit 2. The pulse width of the pulse input to the multi-vibrator 3 is changed according to the voltage of the modulating input information $f_{m1}$ ((b) in FIG. 2) also impressed on the multi-vibrator 3. Thus, the pulse width, that is, the phase of the trailing edge of the output pulses is changed in proportion to the voltage of the modulating input signal $f_{m1}$ (as shown at (d) in FIG. 2). Similarly, the negative trigger pulses ((g) in FIG. 2) obtained from the differentiating circuit 2 are used to trigger the other monostable multi-vibrator 4, and the pulse width of its output pulses is changed according to the voltage of the modulating input $f_{m2}$ ((e) in FIG. 2) to be transmitted. Thus, the pulse width or trailing edge phase of the output pulses is changed in proportion to the voltage of the modulating input $f_{m2}$ as shown at (f) in FIG. 2. The outputs of the monostable multi-vibrators 3 and 4 are differentiated by respective differentiating circuits 5 and 6. The output pulses of the differentiating circuits 5 and 6 corresponding to the trailing edge of the multi-vibrator output pulses are taken out and combined into a pulse train as shown at (e) in FIG. 2, which is used to trigger a next-stage bistable multi-vibrator 7. The multi-vibrator 7 thus produces output signal as shown at (j) in FIG. 2. The output signal (j) produced in the above manner has a so-called pulse-phase double modulation type waveform with the leading edge of the carrier pulse wave shifted in phase in proportion to the modulating input $f_{m1}$ to be transmitted and the trailing edge of the carrier wave shifted in proportion to the other modulating input $f_{m2}$ also to be transmitted. The output signal thus obtained is transmitted via a transmission line such as a telephone line.

Figure 3:
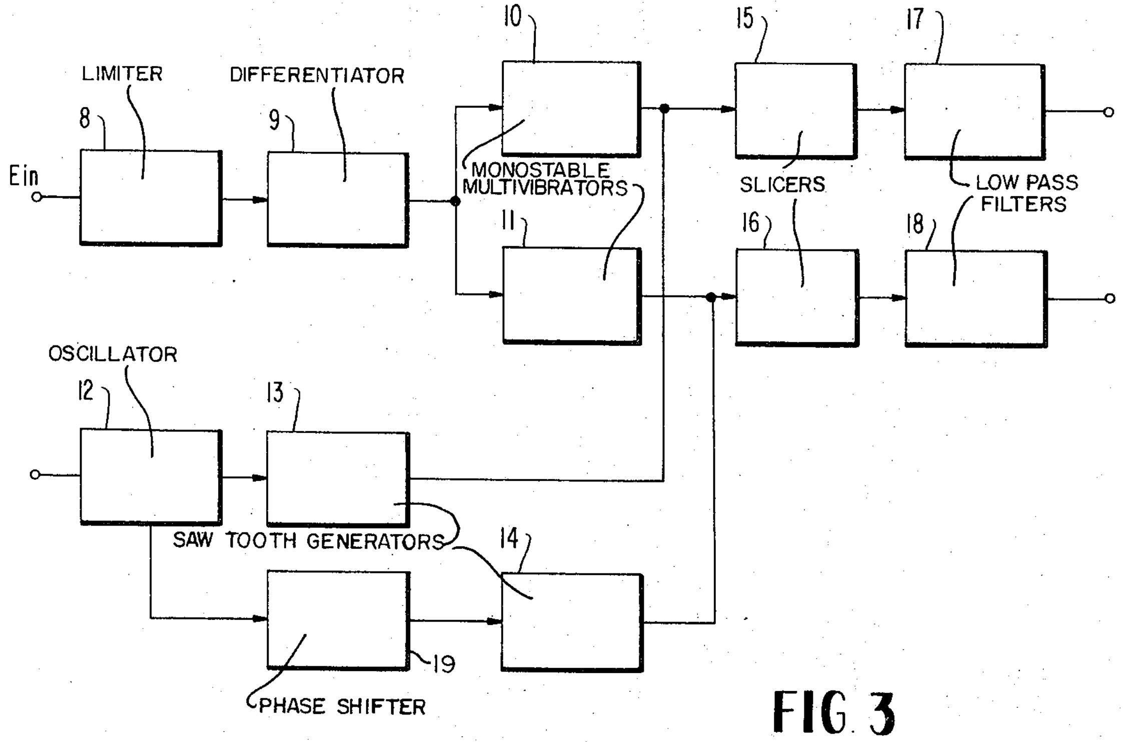
FIG. 3 is a block diagram of a receiver.
Figure 4:
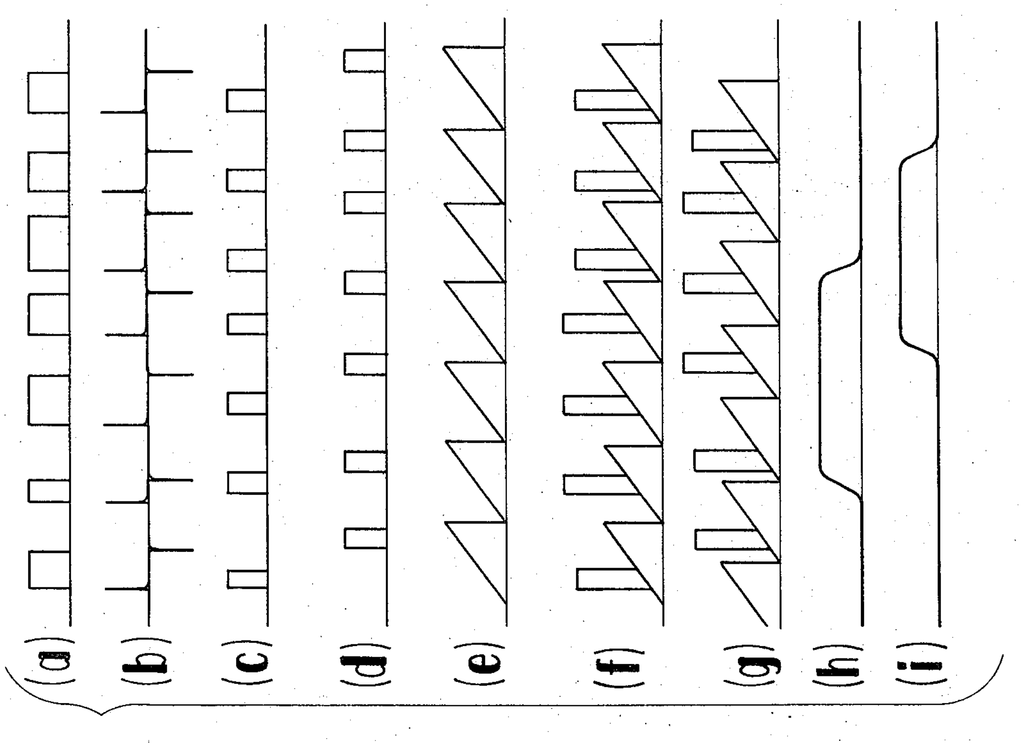
FIG. 4 is a waveform chart to illustrate the operation of the same.

FIG. 3 shows a receiver to receive the signal transmitted in the above way. In the illustrated receiver, a limiter 8 shapes the received signal, and the shaped signal is coupled to a differentiating circuit 9, which produces positive and negative trigger pulses corresponding to the leading and trailing edges of the modulated carrier wave input (as shown at (b) in FIG. 4). Of the trigger pulses thus obtained the positive ones are used to trigger one of two next-stage monostable multi-vibrators 10 and 11, namely, multi-vibrator 10, which produces output pulses as shown at (c) in FIG. 4. These output pulses have a constant pulse width. The negative trigger pulses are similarly used to trigger the other monostable multi-vibrator 11 to obtain pulses as shown at (d) in FIG. 4. Meanwhile, an oscillator 12, which is synchronized to the carrier pulse wave on the transmitter side, produces a synchronizing signal to control saw-tooth generator 13 and saw-tooth generator 14 through phase shifter 19 producing saw-tooth waves (the output of generator 13 being shown at (e) in FIG. 4). The outputs of the saw-tooth generators 13 and 14 are combined with the outputs of the respective monostable multi-vibrators 10 and 11 to obtain two resultant signals respectively shown at (f) and (g) in FIG. 4. These two signals are coupled through respective slicers 15 and 16 and low-pass filters 17 and 18 for amplitude modulation and detection to recover the original two-channel signal pair as shown at (h) and (i) in FIG. 4.

The transmitter and receiver circuits of FIGS. 1 and 3 described above are only examples embodying the invention and by no means limitative, and changes and modifications in the details of the circuit construction may of course be made without departing from the principles discussed earlier.

As has been described in the foregoing, according to the invention it is possible to obtain two-channel signal simultaneous transmission via a single transmission line without the necessity of expanding bandwidth requirements. This means that it is possible to obtain effective bandwidth contraction, which is very useful in widely improving the transmission efficiency.

What is claimed is:

1. A system for communicating two information signals, comprising means for generating a carrier pulse wave;

means for modulating the leading edge of each pulse of said carrier pulse wave with one of said two information signals, said means for phase modulating the leading edge of said carrier pulse wave comprising (a) means for deriving first pulses corresponding to the said leading edges of the carrier pulse wave, (b) a first monostable multivibrator responsive to said first pulses and said one information signal, so that the phase of the trailing edges of the first monostable multivibrator output pulses are modulated by said one information signal, and (c) means for extracting first modulated pulses from said last-mentioned output pulses corresponding to the trailing edges thereof;

means for phase modulating the trailing edge of each pulse of said carrier pulse wave with the other of said two information signals to thereby obtain a double phase modulated signal;

means for transmitting the double phase modulated signal over a communications link;

means at the receiving end of the link for generating a first reference signal responsive to the said carrier pulse wave indicating the phase of the leading edge of said carrier pulse wave;

means at the receiving end of the link for generating a second reference signal responsive to the said carrier pulse wave indicating the phase of the trailing edge of said carrier pulse wave;

means responsive to the double phase modulated signal and said first reference signal for demodulating the double phase modulated signal to obtain said one information signal; and means responsive to the double phase modulated signal and said second reference signal for demodulating the double phase modulated signal to obtain said other information signal.

2. A system as in claim 1 where said means for phase modulating the trailing edge of said carrier pulse wave comprises (a) means for deriving second pulses corresponding to the said trailing edges of the carrier pulse wave, (b) a second monostable multivibrator responsive to said second pulse and said other information signal, so that the phase of the trailing edges of the second monostable multivibrator output pulses are modulated by said other information signal, (c) means for extracting second modulated pulses from said last-mentioned output pulses corresponding to the trailing edges thereof, and (d) means for mixing said first and second modulated pulses to obtain said double phase modulated signal.

* * * * *